Patented Sept. 13, 1932

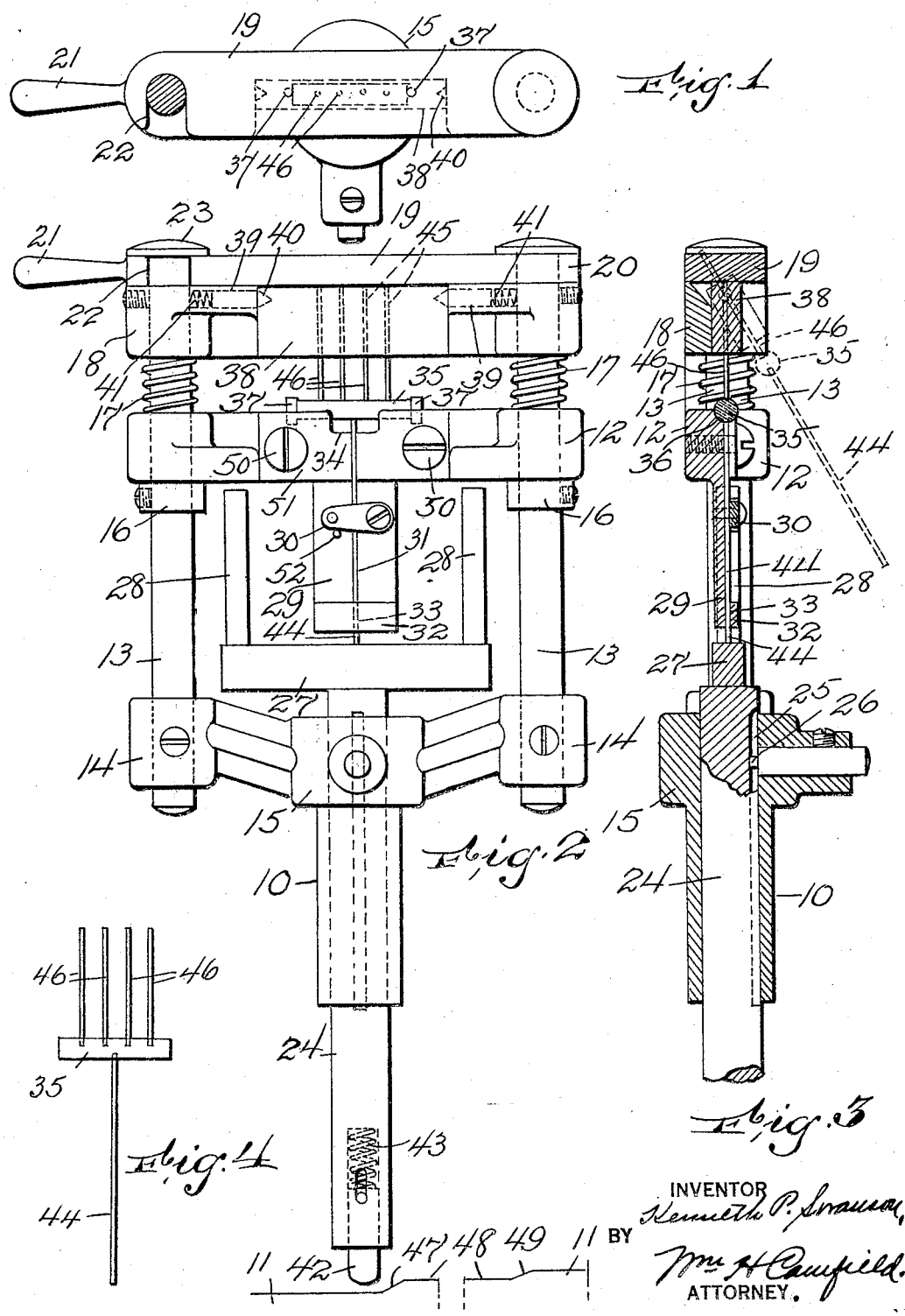

1,877,431

UNITED STATES PATENT OFFICE

KENNETH P. SWANSON, OF IRVINGTON, NEW JERSEY, ASSIGNOR TO EISLER ELECTRIC CORPORATION, OF NEWARK, NEW JERSEY

HEAD FOR BEADING MACHINES

Application filed May 31, 1930. Serial No. 458,006.

This invention relates to an improved beading machine for inserting wires into glass. This class of machine is used in the manufacture of beads which are made of glass and hold wires which support the grid, plates and filaments of radio tubes. The machine can be used for inserting wires into glass beads to be used for other purposes.

The object of the invention is to provide a head for a beading machine which head is operated to push the wires endwise into the bead from opposite sides and it is usual to have the movements successive. The wire on one side is pushed into the heated edge of the bead and then the other side of the bead is softened and the opposite wires inserted. The head is operated by a cam as in the standard machine. The improved head allows the complete insertion from opposite sides in one operation whereas in the old machines the bead was sent through the machine twice, once to insert wires from the top and then the bead was reversed and wires inserted again from the top.

The object of the invention is, furthermore, to provide a bead which allows a quick and easy insertion of the various wires and the bead and a quick and ready removal of the assembled article.

The invention is illustrated in the accompanying drawing in which Figure 1 is a top view of a head embodying my invention. Figure 2 is a front view of the head shown in Figure 1. Figure 3 is a central vertical section of Figure 2. Figure 4 is a side view of a product of the head showing one form as typical of the articles made.

These beads are mounted in machines which include arms to carry the heads in a circular path and subject the beads to heat and wires to an end push at proper times to insert the wires in the glass of the bead. The pushing and releasing is usually done by a circular stationary cam over which the heads are conducted. These machines are not new and one is not illustrated herein, as one skilled in the art will be familiar with this class of machine and understand the operation of the head from the following description.

The header comprises a frame work which is secured by the collar 10 to the rotating frame of a machine and passes around with an intermittent motion over a circular cam a fragment of which is shown at 11.

The frame work has the bead holding arm 12 which is slidable on the two side rods 13 which are secured at their bottoms in the collars 14 of the lower part 15 of the frame. The arm 12 is limited in its downward movement by the collars 16. The springs 17 yieldingly hold the arm 12 down on the collars 16 and abut on the two bearings 18 fastened at the top of the rods 13.

A cover 19 is pivoted at one end as at 20 to the top of an arm 13 and is movable thereon laterally by the handle 21 and has a slotted part 22 to embrace the top end of the other rod 13 and is seated under the head 23 on the rod.

Slidable in the collar 10 is a plunger 24 which is provided with a key way 25 which receives the key 26. The plunger has at its top end the cross-piece 27 and two side standards 28.

The bead supporting arm has a downwardly projecting extension 29 which is provided with a latch 30. The latch crosses the slot 31 which extends on the surface of the extension 29 and the arm 12. The extension has a lip 32 which has a hole 33 in extension of the slot 31. The arm 12 is cut away as at 34 to allow the flame from a burner to be directed on the glass cane or bead 35 which rests on the curved upper face 36 of the arm 12 and rests between pins 37 on the top of the arm.

The top bearings 18 receive the wire guide block 38 which is preferably pivoted to swing between the bearings. It is held normally in position by pins 39 which have pointed ends 40 fitting into recesses in the ends of the block 38 and are pressed outwardly by springs 41.

The plunger 24 has the pin 42 in its end and this is arranged so that it can retreat into the end of the plunger. The spring 43 is strong enough to resist ordinary pressure necessary for inserting wires into the bead but if anything becomes jammed in the head the spring allows the pin 42 to retreat into the plunger and nothing is broken when the cam 11 operates on the plunger.

In Figure 4 I show a bead when completed, this form showing four wires in the top of the bead and one wire inserted into the bottom of the bead.

The operation of the device is as follows:

The wire 44 to be inserted into the bottom of the cane is placed into the hole 33 and the slot 31 and the latch 30 moved across it to keep it in place. The cane 35 is then laid on the arm 12. The cover 19 has been swung to open position on the removal of the last finished bead but if not is swung back to uncover the holes 45 in the block 38 and the wires 46 are dropped into holes 45 and rest on the bead 35. The cover 19 is then swung to closed position and prevents upward movement of the wires 46.

The head is then advanced by the machine to a flame which heats the lower edge of the bead 35 through opening 34. This is followed by the movement of the head over the rise 47 of the cam and the plunger pushes up on the cross-arm 27 on which the wire 44 rests. This pushes the wire 44 into the cane as the cam only raises the cross arm far enough to inset the wire 44 the desired distance.

At the next stop in the movement of the head the next flame is directed to the top edge of the bead 35. Then the head is moved from cam surface 48 on which is rested to the rise 49. This pushes the plunger 24 and cross arm 27 still further and the tops of the standards 28 push up on the arm 12 which holds the bead and the bead is pushed against the wires 46 to imbed their ends in the glass of the bead 35.

After this the cam allows springs 17 to push the arm 12 down and the plunger 24 also drops. The latch 30 is moved from across the wire 44 and the cover 19 is swung back out of the way.

The finished head is raised until the bottom part of wire 44 clears the top of the opening 33 and then the wire 44 is swung outwardly as shown in dotted lines in Figure 2. This rocks the block 38 on the pins 39 and the wires 46 can be slid down and out of the block and finished bead is clear of the machine. The head is then ready for another operation.

The head can be altered for various numbers of top or bottom wires according to the requirements. The central part 51 of the arm 12 and its extension 29 can be attached and removed by screws 50 and the block 38 is removable by snapping it out or in from or to position between the spring pins 39.

The latch 30 can be made of spring metal to allow it to clear the pin 52 or the pin 52 or the pivot pin of the latch can allow slight movement sufficient to allow the latch to be pushed over the pin.

Various changes can be made in the arrangement and proportion of the parts without departing from the scope of the invention.

I claim:—

1. A head for beading machines comprising a framework, a sliding holder for a bead, a guide to hold wires that rest on the bead against movement, the bead holder having a groove to receive a wire under the bead and a plunger to successively engage the lower wire and then the bead holder to successively insert the lower and upper wires in the bead.

2. A head for beading machines comprising a frame work having spaced side rods, a holder for a bead, said holder being slidable on the rods, a guide for wire secured on said side rods and above the bead holder, the bead holder having a groove to receive a wire under the bead, and a plunger slidable on the rods and having a face to engage the wire under the bead and having standards to engage the under side of the bead holder.

3. A head for beading machines comprising a frame, a movable bead holder in the frame, a wire guide on one side of the holder to hold wire in line with the bead, the bead holder having a groove to hold a wire on the opposite side of the bead, and means for successively moving the last mentioned wire and then the bead holder to insert all the wires into the bead.

In testimony whereof he affixes his signature.

KENNETH P. SWANSON.